(12) United States Patent
Uratani

(10) Patent No.: US 6,966,257 B2
(45) Date of Patent: Nov. 22, 2005

(54) REMOVABLE MARKING DEVICE FOR MOLD

(75) Inventor: Hideki Uratani, Nishinomiya (JP)

(73) Assignee: Uratanishoji Kabushiki Kaisha, (JP)

( * ) Notice: Subject to any disclaimer, the term of this patent is extended or adjusted under 35 U.S.C. 154(b) by 0 days.

(21) Appl. No.: 10/832,644

(22) Filed: Apr. 26, 2004

(65) Prior Publication Data

US 2005/0199142 A1 Sep. 15, 2005

(30) Foreign Application Priority Data

Mar. 12, 2004 (JP) .............................. 2004-070175

(51) Int. Cl.[7] .................... B41F 1/07; B28B 17/00; A23G 1/20
(52) U.S. Cl. .................... 101/4; 425/182; 425/183; 425/190; 425/192; 425/193; 425/195
(58) Field of Search ........................... 101/4; 164/236; 249/104, 140, 103; 425/182, 183, 190, 192, 425/193, 195; 116/311, 312, 280

(56) References Cited

U.S. PATENT DOCUMENTS

| | | | |
|---|---|---|---|
| 4,137,962 A | * | 2/1979 | Pol .............................. 164/236 |
| 5,788,872 A | * | 8/1998 | Uratani ......................... 249/103 |
| 5,902,512 A | * | 5/1999 | Streit .......................... 249/103 |
| 6,308,929 B1 | * | 10/2001 | Wieder ......................... 249/103 |
| 6,499,423 B2 | * | 12/2002 | Mills ........................... 116/308 |
| 6,663,371 B2 | * | 12/2003 | Curl ............................. 425/12 |
| 6,722,273 B1 | * | 4/2004 | Navarra Pruna ............... 101/72 |

FOREIGN PATENT DOCUMENTS

JP             3470880         8/2000

\* cited by examiner

*Primary Examiner*—Andrew H. Hirshfeld
*Assistant Examiner*—Marvin P Crenshaw
(74) *Attorney, Agent, or Firm*—Perkins Coie LLP

(57) ABSTRACT

A removable marking device for mold consists of a substantially cylindrical outer member, an indicator can be rotated around axis line of outer member, a mark portion that is formed on upper surface of outer member and said indicator, wherein in said indicator, plural positioning projection portions protruding in radial direction of indicator is located, positioning projection portion consists of a positioning spring buried in indicator and an insert portion located in a tip of positioning spring, in inner wall of outer member, a positioning groove extending axis direction of outer member is formed at even intervals along circumferential direction of middle bore portion, in plural positioning projection portions, when at least one positioning projection portion is inserted in positioning groove, other positioning projection portion touches in inner wall of outer member in positioning groove.

18 Claims, 8 Drawing Sheets

(a)

(b)

(c)

(a)

(b)

REMOVABLE MARKING DEVICE FOR MOLD

RELATED APPLICATIONS

This application claims the benefit under 35 U.S.C. §119 of Japanese Patent Application No. 2004-70175, filed Mar. 12, 2004, incorporated herein by reference in its entirety.

FIELD OF THE INVENTION

This invention concerns a marking device for mold to mark on each molded product, and in particular to a removable marking device for mold with accurately adapting a position of an indicator to a position of an outer indicator position in marking to a small product.

BACKGROUND OF THE INVENTION

Surfaces of molded products generally have various indications such as a date of production, lot number, product number and so on by which producers can clear up causes of inferior molded products or check their stock.

A marking device is removably inserted into a mold with its indication portion facing the inner surface of the mold and held there during molding so that the above mentioned indications carried on the indication portion can be marked on each molded product.

One conventional marking device is shown in reference 1, and the device is shown in FIG. 8. The marking device consists of a substantially cylindrical outer member (O), which mark data is marked in upper surface, a substantially volt shape indicator portion (I) of a spring (S), a nut (N), and a cover member (C).

The indicator portion (I) is fitted in the outer member (O) from upper of the outer member (O). The nut (N) is installed in the outer member (O) from its downward. The nut (N) is screwed with a thread (I1) formed lower of the indicator portion (I).

The spring (S) is located between the nut (N) and a bore portion (O1) formed in middle portion of inner wall of the outer member (O) in axial direction. The spring (S) downwardly biases the nut (N) and the indicator portion (I) connected with the nut (N). The cover member (C) is screwed with a female screw formed in lower part of the inner wall of the outer member (O). The cover member (C) closes a lower opening of the outer member (O).

In middle portion of the indicator portion (I), a projection portion (I2) which consists of a spring and a sphere protrudes in radial direction of the indicator portion (I).

Further, plural positioning grooves (O3) that a projection portion (I2) is fit circumferentially formed equally at a bore portion (O1) of the outer member (O). The number of the positioning groove (O3) is decided based on the number of characters marked on upper surface of the outer member (O).

For example, as shown in FIG. 8, numerical characters are carved in upper surface of the outer shell body (O). In case of the numbers of the numeral characteristic are 1~12, twelve positioning grooves (O3) are carved.

A structure of the marking device described in the reference 1 is that when the indicator portion (I) is revolved, a projection portion (I2) protruded from the indicator portion (I) is fit in the positioning groove (O3), an angular position of the indicator portion (I) is tightly fixed at desire position.

Reference 1 Japan Patent No. 3470880

Since the marking device described in the reference 1 has above-mentioned structure, it has reliable positioning function, but there are following problems.

In case of size of a molded product is small, a size of the marking device is also small. Therefore, length of inner circumference of the outer member is also shortens. In case of manufacture month is carved on the outer member, number of numeric characters are 12, and as mentioned above, the positioning grooves must be formed twelve.

Therefore, width of formed positioning groove narrows as decreasing size of the marking device. Narrowing of the width of the positioning groove causes decreasing of engagement with projection for positioning. As a result, reliable positioning cannot be maintained.

As a method for increasing engagement, depth of the positioning groove may be deepened, but rotation of the indicator may be hard and prevented.

Increasing of indicated numeric character carved on the outer member has similar problem.

In view of the problem of prior art's marking devices as mentioned above, the present invention provides a removable marking device having reliable positioning function, even if the size of the device is small.

According to an invention described in claim 1 and 2, when at least one of the projection portions for positioning is fit in the positioning groove, other projection portions touches to inner surface of the outer member, the indicator can be tightly fixed.

Further, the positioning groove can be decreased as the number of the projection portion decreasing, and the positioning groove having wide width can be formed, or the carved character of the outer member can increase twice.

According to the invention described in claim 3, since the nut and the indicator connected with the nut are biased downwardly with the spring, upper surface of the indicator and upper surface of outer member are in same surface, convexoconcave of marking surface can be prevented.

According to the invention described in claim 4, since an engageable projection of the nut and an engageable groove are engaged at lower part of the outer member, the nut does not rotate. Torque is not applied to the spring which touches the nut and the force is applied only in telescopic motion direction, and a damage of the spring can be prevented.

According to the invention described in claim 5 and 6, lower end of the indicator is inserted in the opening formed in the cover member, and breaking of conjunction of the nut and a thread in adjustment of marking can surely be prevented, and a thinner nut can be used.

Therefore, distance of nut's movement can be longer, and the adjustment of marking can be simply and easily.

According to the invention described in claim 7~9, when the nut moves from lower portion to upper portion by adjusting of angular position of the indicator, movement of the nut is limited at upper end of the engageable groove. Therefore, damage of thread of the indicator can be prevented, because the nut does not engage to bottom end of the thread part of the indicator.

According to the invention described in claim 10~18, since a hemisphere of a spherical inserted part is inserted into the positioning groove, the indicator is reliably positioned and the inserted part is not entangled in the positioning groove, damage of the positioning projection portion can be prevented.

SUMMARY OF THE INVENTION

Figure 1:
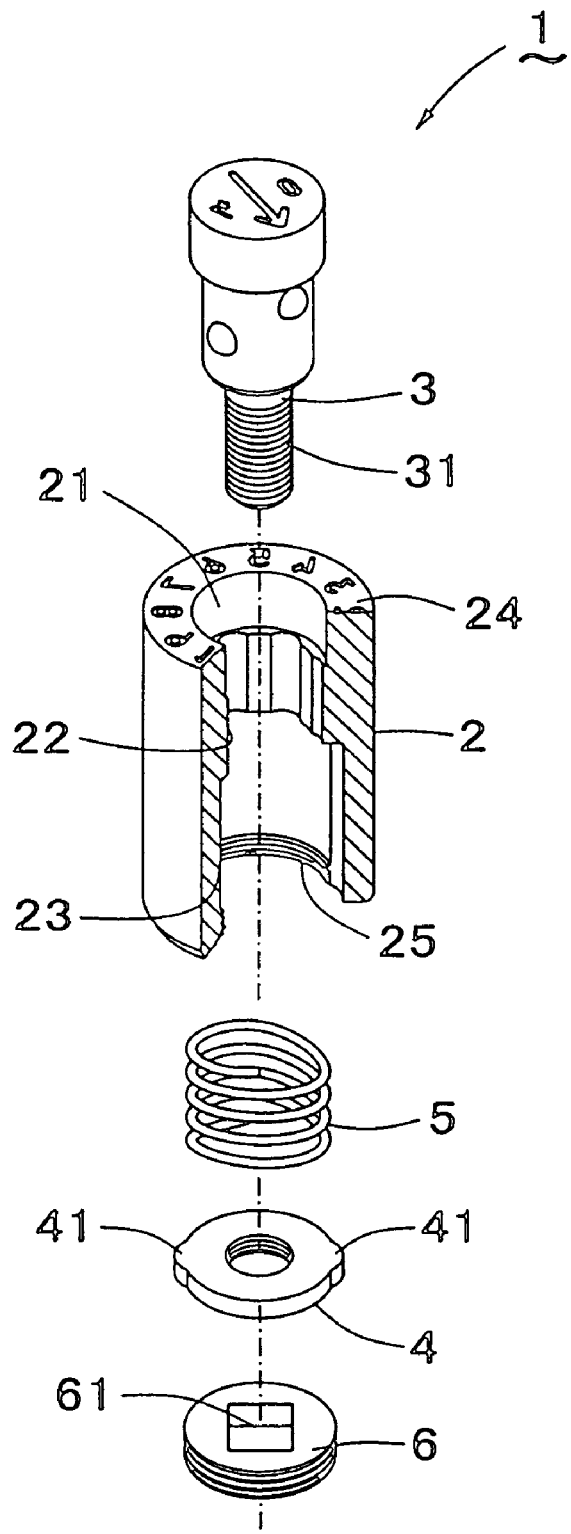
FIG. 1 is an exploded perspective view of the removable marking device for mold of the present invention.

The invention concerning the claim 1 relates a removable marking device for mold consists of a substantially cylindrical outer member, an indicator can be rotated around axis line of the outer member, a mark portion that is formed on upper surface of said outer member and said indicator, wherein in said indicator, plural positioning projection portions protruding in radial direction of said indicator is located, the positioning projection portion consists of a positioning spring buried in said indicator and an insert portion located in a tip of the positioning spring, in inner wall of the outer member, a positioning groove extending axis direction of said outer member is formed at even intervals along circumferential direction of said middle bore portion, in said plural positioning projection portions, when at least one positioning projection portion is inserted in the positioning groove, other positioning projection portion touches in inner wall of the outer member in the positioning groove.

The invention concerning the claim 2 relates the removable marking device for mold consists of the substantially cylindrical outer member, the indicator can be rotated around axis line of the outer member, a fixing method so that fixing lower end of said indicator rotatably with locating bottom end of said outer member, the mark portion that is formed on upper surface of said outer member and said indicator, wherein said indicator has an indication portion facing inner surface of said mold and a positioning portion downwardly extending from lower surface of said indicator, in inner wall of said outer member, an upper bore portion containing said indicator and a middle bore portion having smaller diameter than a diameter of said upper bore portion with positioning said positioning portion, in said positioning portion, a pair of positioning projection protruding in radial direction of the positioning portion is located, each projection direction of projection portion of the pair of positioning projection is right angle each other, the positioning projection portion consists of a positioning spring buried in said indicator and an insert portion located in a tip of the positioning spring, in said middle bore portion, a positioning groove extending axis direction of said outer member is formed at even intervals along circumferential direction of said middle bore portion, a number of said positioning groove is except for multiple number of 4.

The invention concerning the claim 3 relates the removable marking device for mold described in claim 2, wherein said indicator has a thread downwardly extending from said positioning portion, said fixing method is a nut screwed with said thread, in said outer member, a lower bore portion having larger diameter than a diameter of said middle bore portion in lower of the middle bore portion, a spring is interposed between said nut and upper surface of said lower bore portion and said spring is downwardly biased to said nut.

The invention concerning the claim 4 relates the removable marking device for mold described in claim 3, wherein greater or equal one engageable projection is formed on a periphery surface of said nut, and in said lower bore portion, an engageable groove engaged with said engageable projection is formed.

The invention concerning the claim 5 relates the removable marking device for mold described in claim 3, wherein a cover member is fit in bottom end of said outer member, an opening is formed in center of said cover member and lower end of said indicator is inserted in said opening.

The invention concerning the claim 6 relates the removable marking device for mold described in claim 4, wherein a cover member is fit in bottom end of said outer member, an opening is formed in center of said cover member and lower end of said indicator is inserted in said opening.

The invention concerning the claim 7 relates the removable marking device for mold described in claim 4, wherein when an upper surface of said indicator is flush with an upper surface of said outer member, bottom end of a thread of said indicator is positioned above than upper end of said engageable groove.

The invention concerning the claim 8 relates the removable marking device for mold described in claim 5, wherein when an upper surface of said indicator is flush with an upper surface of said outer member, bottom end of a thread of said indicator is positioned above than upper end of said engageable groove.

The invention concerning the claim 9 relates the removable marking device for mold described in claim 6, wherein when an upper surface of said indicator is flush with an upper surface of said outer member, bottom end of a thread of said indicator is positioned above than upper end of said engageable groove.

The invention concerning the claim 10 relates the removable marking device for mold described in claim 1, wherein said positioning groove is formed so that its cross section is substantially half circle, said inserted portion is formed spherically and curvature radius of said positioning groove is substantially equal to radius of said inserted portion.

The invention concerning the claim 11 relates the removable marking device for mold described in claim 2, wherein said positioning groove is formed so that its cross section is substantially half circle, said inserted portion is formed spherically and curvature radius of said positioning groove is substantially equal to radius of said inserted portion.

The invention concerning the claim 12 relates the removable marking device for mold described in claim 3, wherein said positioning groove is formed so that its cross section is substantially half circle, said inserted portion is formed spherically and curvature radius of said positioning groove is substantially equal to radius of said inserted portion.

The invention concerning the claim 13 relates the removable marking device for mold described in claim 4, wherein said positioning groove is formed so that its cross section is substantially half circle, said inserted portion is formed spherically and curvature radius of said positioning groove is substantially equal to radius of said inserted portion.

The invention concerning the claim 14 relates the removable marking device for mold described in claim 5, wherein said positioning groove is formed so that its cross section is substantially half circle, said inserted portion is formed spherically and curvature radius of said positioning groove is substantially equal to radius of said inserted portion.

The invention concerning the claim 15 relates the removable marking device for mold described in claim 6, wherein said positioning groove is formed so that its cross section is substantially half circle, said inserted portion is formed spherically and curvature radius of said positioning groove is substantially equal to radius of said inserted portion.

The invention concerning the claim 16 relates the removable marking device for mold described in claim 7, wherein said positioning groove is formed so that its cross section is substantially half circle, said inserted portion is formed spherically and curvature radius of said positioning groove is substantially equal to radius of said inserted portion.

The invention concerning the claim 17 relates the removable marking device for mold described in claim 8, wherein said positioning groove is formed so that its cross section is substantially half circle, said inserted portion is formed spherically and curvature radius of said positioning groove is substantially equal to radius of said inserted portion.

The invention concerning the claim 18 relates the removable marking device for mold described in claim 9, wherein said positioning groove is formed so that its cross section is substantially half circle, said inserted portion is formed spherically and curvature radius of said positioning groove is substantially equal to radius of said inserted portion.

DETAILED DESCRIPTION OF THE INVENTION

Hereinafter, embodiments of the removable marking device for mold of the present invention is explained with referring to drawings. FIG. 1 is an exploded perspective view of the removable marking device for mold. A marking device (1) consists of a substantive cylindrical outer member (2) and an indicator (3) fit into the outer member (2) from upper direction. The indicator (3) can be rotated around axis line of the outer member (2).

A nut (4) is screwed with a thread (31) formed in lower portion of the indicator (3) so that to fix the indicator (3) rotatably.

An inner wall of the outer member (2) is divided into three parts, and from upper, an upper bore portion (21), a middle bore portion (22) having shorter diameter and a lower bore portion (23) having longer diameter than the middle bore portion (22) are formed. A spring (5) is interposed between an upper surface of the lower bore portion (23) and the nut (4). The spring biases the nut (4) downwardly.

A female screw (25) is formed in lower end of the lower bore portion (23) of the outer member (2), and a cover member (6) is screwed with the female screw (25).

Figure 2:
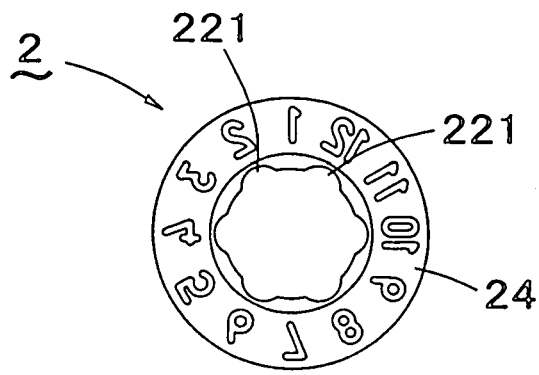
FIG. 2 is a view showing an outer member of the present invention. (a) shows the outer member from upper direction. (b) is a longitudinal sectional view of the outer member. (c) shows the outer member from lower direction.
Figure 2:
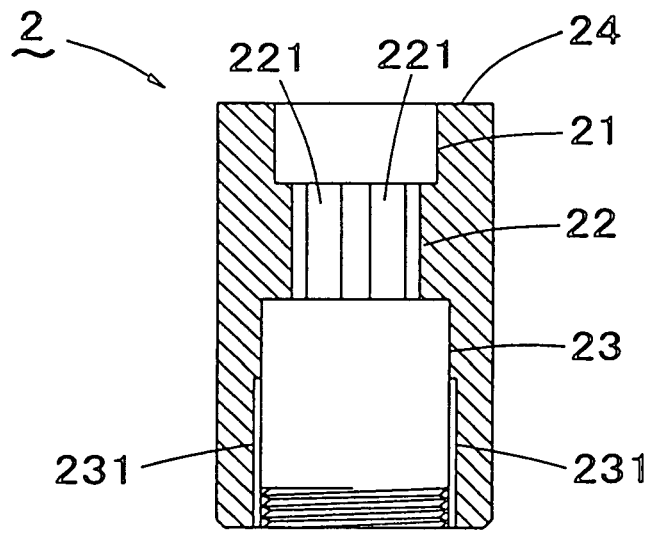
Figure 2:
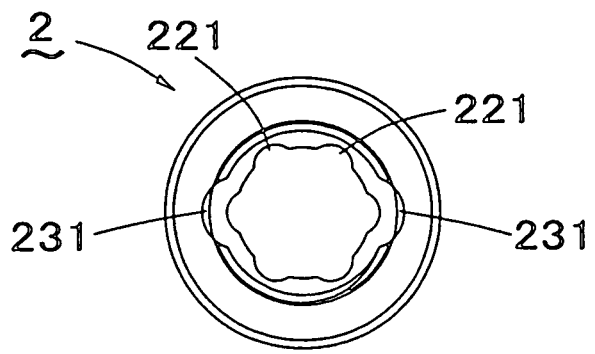

The outer member (2) is shown in FIG. 2. FIG. 2(*a*) shows the outer member (2) from upper direction. FIG. 2(*b*) is a longitudinal sectional view of the outer member (2). FIG. 2(*c*) shows the outer member (2) from lower direction.

Numeric characters are carved on upper surface of the outer member (2), and a mark portion (24) is formed. When the outer member (2) is fit into the mold, the mark portion (24) is exposed inner surface of the mold, and the numeric characters of the mark portion (24) are marked on a molded product.

In the drawing, numeric characters from 1 to 12 are carved on the mark portion (24). In the present invention, curved character of the mark portion is not limited to numeric, and any character such as date manufactured, lot number and production line number can be carved.

Inner wall of the outer member (2) is divided into three parts, and from the top, an upper bore portion (21), a middle bore portion (22) and a lower bore portion (23). A diameter of the middle bore portion (22) is shorter than diameter of other two portions.

As shown in FIG. 2, plural positioning grooves (221) are formed in the middle bore portion (22). The positioning groove (221) extends to the outer member (2) in axial direction.

Further, each positioning groove (221) is equally spaced along circumferential direction. In the present invention, number of the positioning groove (221) is half of required positioning portion. In FIG. 2, 12 numeric characters showing each manufacturing month are carved on the mark portion (24). Therefore, 12 positioning portions are necessary, and 6 positioning grooves (221) are formed in FIG. 2.

If number of the positioning portion is odd number, number of the positioning groove (221) may be half of the positioning portions added 1. In the present invention, since compared to a conventional marking device, required number of the positioning groove (221) is half, even if a diameter of the marking device (1) decreases or required positioning portion increases, enough width of the positioning groove (221) can be widened.

In other word, compared to the conventional marking device, the present invention can decrease half length of diameter of the marking device or number of positioning portion can increase twice.

In lower bore portion (23) of the outer member (2), an engageable groove (231) extends in axial direction of the outer member (2) from bottom end of the lower bore portion (23).

When the nut (4) screws with the thread (31) of the indicator (3), an engageable projection (41) formed in periphery surface of the nut (4) is engaged to the engageable groove (231) (refer to FIG. 1).

By this, when the indicator (3) rotates, rotation of the nut (4) is stopped, and it moves only in axial direction of the outer member (2). Therefore, damage of a spring (5) is prevented, because force in rotation direction is not applied to the spring (5). The force is applied only in telescopic motion direction.

In FIG. 2, number of the engageable groove (231) and number of the engageable projection (41) formed in the nut (4) are same, and two engageable grooves (231) are shown. Number of the engageable groove (231) and the engageable projection (41) are not limited. Any number of the engageable groove (231) and number of the engageable projection (41), for example one or greater or equal three can be formed. By locating plural engageable grooves (231) and engageable projections (41), the nut (4) does not rotate.

As shown in FIG. 1, at bottom end of the lower bore portion (23) of the outer member (2), a female screw (25) is formed, and the cover member (6) is screwed with the female screw (25). An opening (61) is formed in center of the cover member (6). Size of the opening (61) is larger than the bottom end of the indicator (3). The bottom end of the indicator (3) can be inserted into the opening (61), and when the indicator (3) rotates, a deviation of the nut (4) from the thread (31) of the indicator (3) can surely be prevented. As a result, the thinner nut (4) can be used.

Reduction of thickness of the nut (4) can lengthen distance of movement on the thread (31). It can increase rotation of the indicator (3) in fixed direction, and it makes adjustment of marking which rotates the indicator (3) efficient.

As shown in FIG. 1, a shape of the opening (61) is square, but circular form can be available. By using the square opening (61), the cover member (6) can be mounted to the outer member (2) by inserting a tool such as a wrench.

Figure 3:
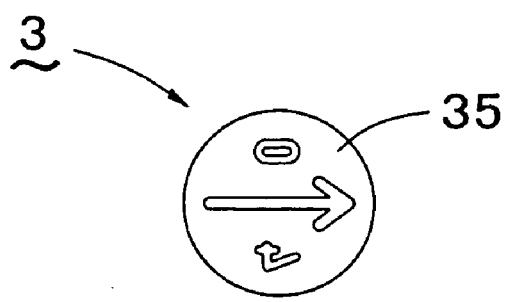
FIG. 3 is a view showing the indicator of the present invention. (a) shows the indicator from upper direction. (b) shows the indicator from front side.
Figure 3:
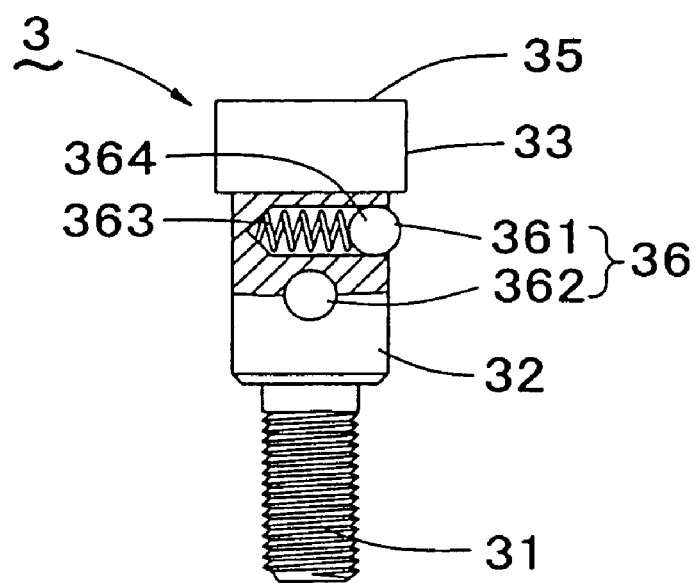

The indicator (3) is shown in FIG. 3. FIG. 3(a) shows the indicator from upper direction. FIG. 3(b) shows the indicator from front side.

The indicator (3) has three portions, and from upper, an indicator portion (33), a positioning portion (32) extending downwardly from lower surface of the indication portion (33) and a thread (31) down below of the positioning portion (32) are formed.

The indicator (33) is contained in the upper bore portion (21) of the outer member (2).

Height of the indicator portion (33) is formed equally to the upper bore portion (21). Therefore, upper surface of the indicator (3) and upper surface of the outer member (2) are in same surface, when the indicator (3) is fit in the outer member (2).

On upper surface of the indicator portion (33), numeric characters are carved, and a mark portion (35) is formed. When the marking device (1) is fit into a mold, the mark portion (35) is exposed inner surface of the mold, and the numeric characters of the mark portion (35) are marked on a molded product.

In an example shown in FIG. 3, on the mark portion (35), numeric character "40" and arrow are carved for identifying the mold. In the present invention, character of the mark portion (35) is not limited. In the example shown in FIG. 3, the indicator (3) can be rotated by inserting a flat head in the carved arrow.

For example, a mark showing that mold number is 40 and month of manufacture is March can be molded by applying the arrow to a character "3" carved on the mark portion (24) of the outer member (2).

The positioning portion (32) formed lower of the indication portion (33) is positioned in inner of the middle bore portion (22) of the outer member (2), when the indicator (3) is fit in the outer member (2).

Diameter of the positioning portion (32) is formed shorter than diameter of the indication portion (33), lower surface of the indication portion (33) touches to upper surface of the middle bore portion (22) of the outer member (2).

In the positioning portion (32), pair of positioning projection portion (36) protruded to radial direction is located. In the example shown in FIG. 3, the positioning projection portion (36) is located with different height in axial direction of the positioning portion (32).

The upper positioning projection portion is set as a first positioning projection portion (361) and lower positioning projection portion is set as a second positioning projection portion (362). Protrusion direction of the first positioning projection portion (361) is right angle to the second positioning projection portion (362).

The positioning projection portion (36) consists of a positioning spring (363) and an inserted portion (364) located at the tip of the positioning spring (363).

The positioning spring (363) is buried in a hole formed in the positioning portion (32). The inserted portion (364) is protruded from periphery surface of the positioning portion (32). As shown in FIG. 3, the inserted portion (364) is formed spherically.

Figure 4:
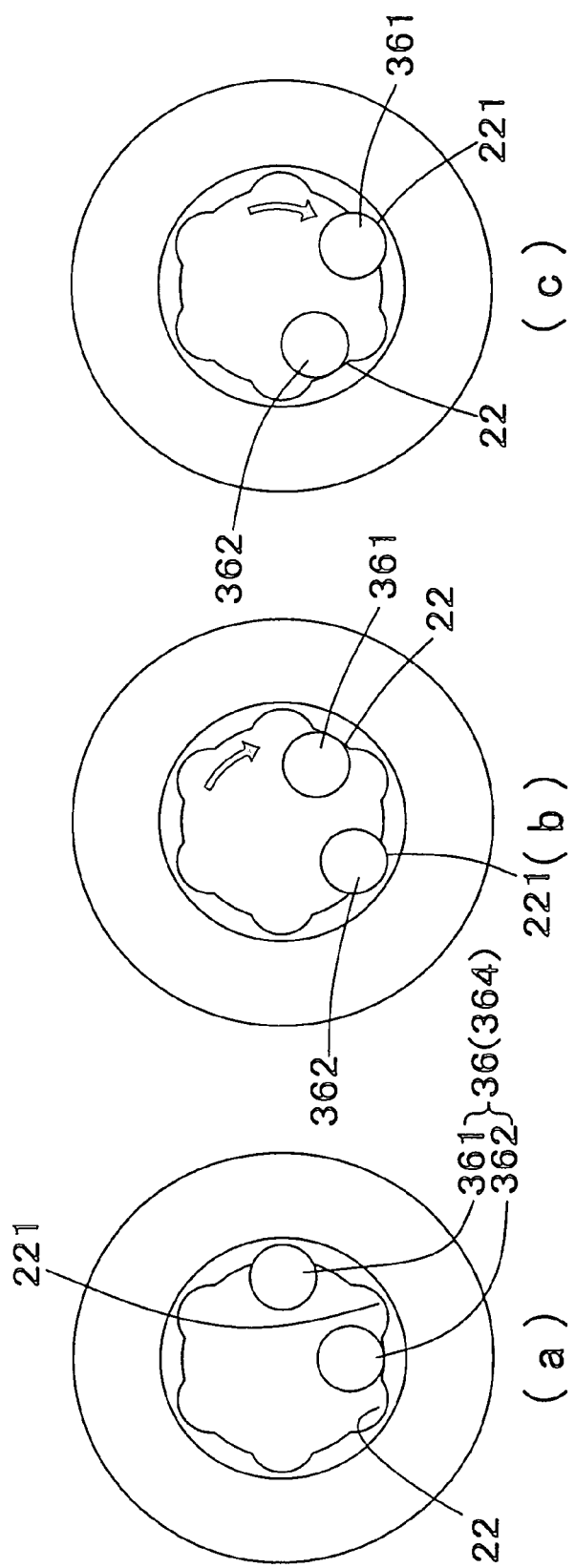
FIG. 4 shows movement of a positioning projection to a positioning groove, when the positioning projection is revolved in clockwise in the outer member. (a) shows a first position of the indicator. (b) shows a position that the indicator is revolved to a next positioning portion. (c) shows a position that the indicator revolves to next positioning portion.

FIG. 4 shows a movement of the positioning projection portion (36) to a positioning groove (221), when the indicator (3) is fit in the outer member (2), and the positioning projection portion (36) is rotated in clockwise.

FIG. 4(a) shows a first position of the indicator. FIG. 4(b) shows a position that the indicator revolves to a next positioning portion. FIG. 4(c) shows a position that the indicator revolves to next positioning portion.

In FIG. 4(a), tip of first positioning projection portion (361) is fit in the positioning groove (221). The second positioning projection portion (362) touches a wall of the middle bore portion (22) between the positioning grooves (221). In this situation, the indicator (3) is tightly positioned and fixed by fitting of the first positioning projection portion (361) and the positioning groove (221).

Since the second positioning projection portion (362) touches the wall of the middle bore portion (22), it assists positioning and fixing of the indicator (3).

The first positioning projection portion (361) touches the wall of the middle bore portion (22) by rotating clockwise. The second positioning projection portion (362) is fit in the positioning groove (221) which is adjacent to a wall shown in FIG. 1(a) (refer to FIG. 4(b)).

The second positioning projection portion (362) works as a stopper for the positioning of the indicator (3) to fix the indicator position. Further, the first positioning projection portion (361) is fit in the positioning groove (221) by rotating the indicator (3) clockwise. The second positioning projection portion (362) touches with the wall of the middle bore portion (22) (refer to FIG. 4(c)).

The first positioning projection portion (361) and the second positioning projection portion (362) are alternately fit in the positioning groove (221), and they work as a stopper of the projection portion. Therefore, required number of formed positioning groove is half of the projection portion, and width of the positioning groove (221) can be formed widely.

In the present invention, since the positioning groove (221) is formed at even intervals in circumferential direction of the middle bore portion (22), a regular polygon can be drawn by connecting center of each positioning groove (221).

In case of number of angle of this regular polygon is multiple of 4, since each diagonal line is orthogonal.

If numbers of formed positioning groove (221) are 4, 8 or 16 etc, both of the first positioning projection portion (361) and the second positioning projection portion (362) are fit in the positioning groove (221).

The first positioning projection portion (361) and the second positioning projection portion (362) cannot be fitted in the positioning groove (221) alternately.

In other words, if number of the positioning groove (221) are not multiple of 4, the first positioning projection portion (361) and the second positioning projection portion (362) can be fitted in the positioning groove (221) alternately.

If number of required positioning portion is multiple of 8 (for example, 8, 16 and 24), numbers of the positioning groove (221) are 4, 8 and 12.

In this case, the present invention can be applied by increasing one positioning groove (221). By increasing the positioning groove (221), the positioning portion increases by two, but a character in the mark portion (24) of the outer member (2) should not be carved in these two positioning portion.

As other example, an angle of pair of positioning projection portions (36) is except for right angle. In case of one of the positioning projection portions (36) is fit in the positioning groove (221), number of the positioning groove (221) is decided so that the other positioning projection portion (36) touches inner wall of the number of the positioning groove (221).

In this way, any number of the positioning groove (221) can be formed, and required number of the positioning portion can be set. In this case, the number of the positioning projection portion (36) may be a multiple, and it is not limited to two projection portion. By locating plural positioning projection portion (36), positioning function can be improved.

Further, by increasing the number of positioning projection portion (36), size of the marking device (1) can be small and positioning portion can increase.

As shown in FIG. 4, it is desirable that an inserted portion (364) located at the tip of the positioning projection portion (36) is spherically. When the inserted portion (364) is moved from wall surface of the middle bore portion (22), since the edge does not catch the positioning projection portion (36), it can prevent damage of the positioning projection portion (36).

Further, in this case, a wall surface of the positioning groove (221) is desirably curved surface having curvature radius which is approximately equal length to radius of spherical inserted portion (364).

Since surface of the positioning groove (221) touches surface of the inserted portion (364), reliable positioning function can be performed.

In case of a cross section of the positioning groove (221) is substantially half circle, touching area with the inserted portion (364) can be maximise. More reliable positioning function can be performed.

Figure 5:
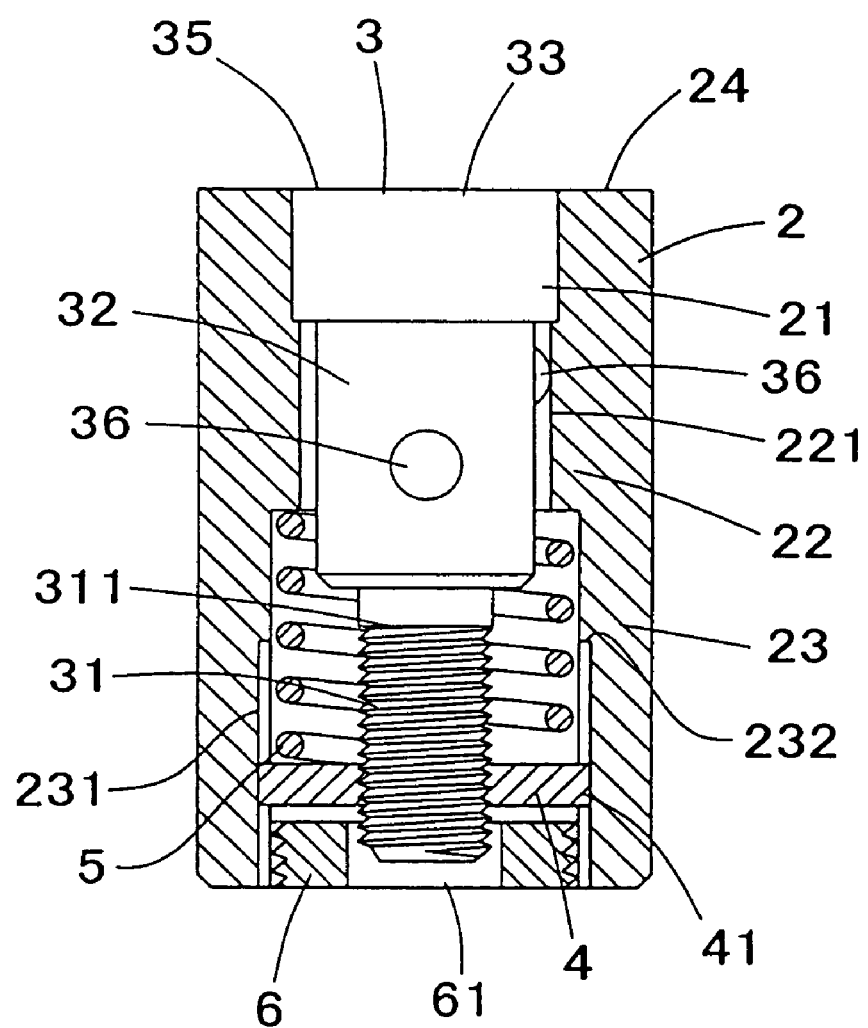
FIG. 5 is an assembly view of the marking device of the present invention.

A construction drawing of the marking device (1) is shown in FIG. 5. As shown in FIG. 5, the indicator (3) is fit in the outer member (2) from upper of the outer member (2).

An indication portion (33) is stored in the upper bore portion (21) of the outer member (2). An upper surface of the indication portion (33) is flush with upper surface of the outer member (2).

Therefore, a bore is not formed in the mark portions (35 and 24) formed in the upper surface of the indication portion (33) and the upper surface of the outer member (2), and mold can be carved.

A positioning portion (32) of the indicator (3) is positioned at the middle bore portion (22) of the outer member (2). The indicator (3) is reliably positioned with the positioning projection portion (36) located in the positioning portion (32) and the positioning groove (221) formed in the middle bore portion (22).

In bottom portion of the outer member (2), a nut (4) is screwed with a thread (31) formed in lower portion of the indicator (3) so that the indicator (3) can rotate.

A spring (5) is located between the nut (4) and a lower bore portion (23). Since force is downwardly applied the spring (5) to the nut (4), force is downwardly applied the indicator (3), and upper surface of the indicator (3) and the outer member (2) are kept in same surface.

The engageable projection (41) of the nut (4) is engaged with an engageable groove (231) formed in the lower bore portion (23) of the outer member (2). When the indicator (3) is rotated clockwise, the marking device (1) moves in axially upper direction.

A bottom end portion (311) of the thread (31) of the indicator (3) is positioned above than an upper end (232) of the engageable groove (231).

Since upward movement of the nut (4) is stopped at the upper end (232) of the engageable groove (231), an inroad of the nut (4) in the bottom end portion (311) of the thread (31) can be prevented, and damage of the thread (31) in adjustment of the mark portion can surely be prevented.

At bottom end of the outer member (2), the cover member (6) is located, and a lower end of the indicator (3) is inserted in an opening (61) formed in center of the cover member (6). By this, the nut (4) does not come out from the indicator (3).

Figure 6:
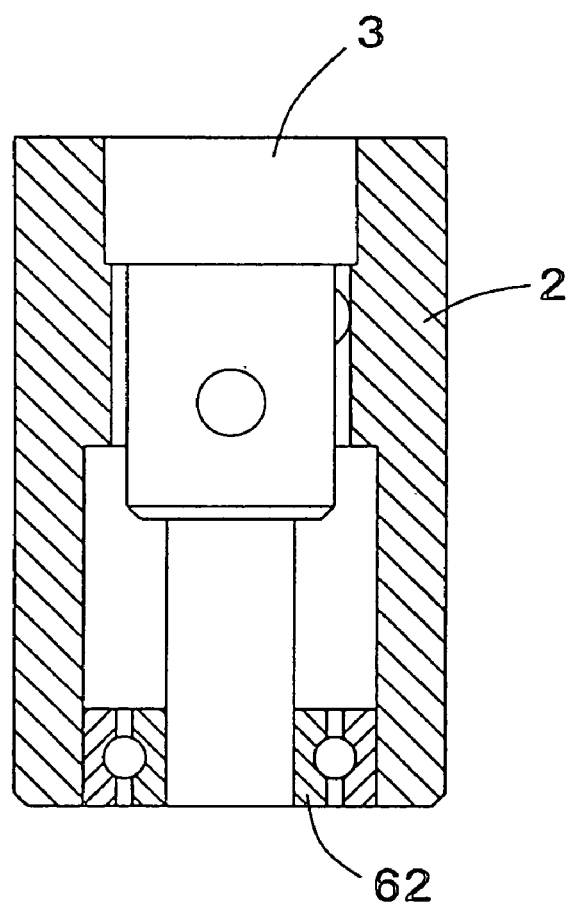
FIG. 6 is a view showing other embodiment of the marking device of the present invention.

Other embodiment is shown in FIG. 6. The embodiment is changed a structure of the lower bore portion (23) of the outer member (2) (that is, the nut (4) or the cover member (6)) from the embodiments shown in FIGS. 1 to 5, but a structure of the upper bore portion (21) and the middle bore portion (22) does not change.

In the embodiments as shown in FIGS. 1 to 5, as a method for fixing the indicator (3) rotatably, the nut (4) is used, in the present invention, the fixing method is not limited to the embodiment.

As shown in FIG. 6, a bearing (62) is located in bottom portion of the outer member (2). The bearing (62) can be connected the bottom of the indicator (3).

Figure 7:
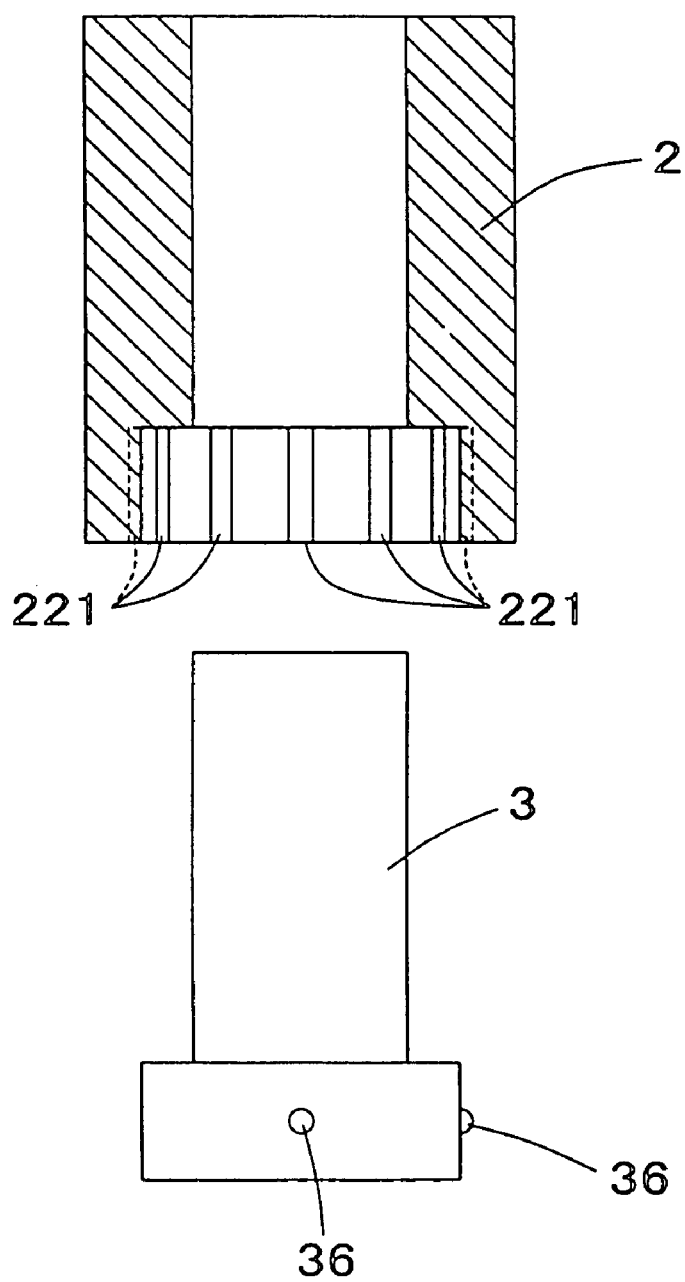
FIG. 7 is a view showing other embodiment of the marking device of the present invention.
Figure 8:
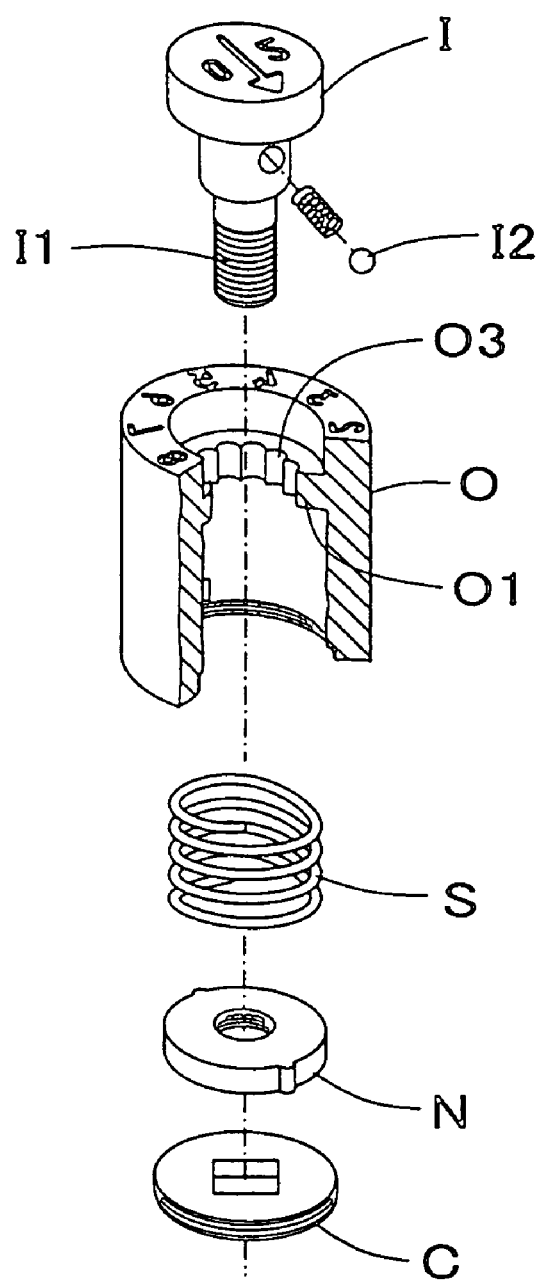
FIG. 8 is a view showing conventional marking device.

Other embodiment is shown in FIG. 7. In the embodiment shown in FIGS. 1 to 5, positioning structure is located in middle portion of axially direction of the marking device (1), but the structure can be located in lower position of the marking device (1).

The marking device (1) shown in FIG. 7 is composed by fitting the indicator (3) from lower of the outer member (2). At the lower of the indicator (3), as same as the embodiment shown in FIGS. 1 to 5, a pair of the positioning projection portion (36) is located.

The positioning projection portion (36) protrudes in radial direction of the indicator (3). Protrusion direction of the pair of the positioning projection portion (36) is right angle to each other.

The positioning groove (221) which is fit in the positioning projection portion (36) is formed in lower portion of inner wall of the outer member (2).

As same as the embodiment shown in FIGS. 1 to 5, positioning grooves (221) that half of required number of the positioning groove (221) are located, and the number is except for multiple number of 4.

As such structure, by locating the positioning grooves (221) that half of required number of the positioning groove (221), positioning can be performed at desirably portion, and width of the positioning groove (221) is widely formed.

As described above, according to the structure of the marking device (1), even if it is small, the width of the positioning groove (221) can be formed that reliable positioning can be performed.

For example, the marking device (1) having twelve positioning portions is exemplified. A character carved in mold is desirably greater or equal 0.5 mm so that it can be recognized visually. In case of making of such the marking device (1), an external diameter of the outer member (2) is greater or equal 4 mm and its thickness is greater or equal 1 mm so that to ensure size of the character carved in a mark portion (24) of the outer member (2). According to structure of the marking device (1), required number of the positioning groove (221) is half number of the conventional marking device, and six positioning grooves (221) is formed.

In this case, greater or equal 0.5 mm of the width of the positioning groove (221) can be kept, and reliable positioning performance can be performed. In prior art, twelve positioning grooves (221) need to be formed. Therefore, the width of the positioning groove (221) is only 0.2 mm, and the inserted portion (364) is also formed small.

In such the narrow positioning groove (221), engaging with the inserted portion (364) is too few, and reliable positioning function cannot be performed.

According to the structure of the marking device (1), even if its diameter is 4 mm, enough positioning function can be performed.

What is claimed is:

1. A removable marking device for a mold comprising:
   a substantially cylindrical outer member,
   an indicator rotatable around an axis of said outer member,
   a mark portion that is formed on an upper surface of said outer member and said indicator,
   wherein said indicator has plural radial projection portions,
   each of said projection portions includes a positioning spring buried in said indicator and an insert portion located at an end of said respective spring,
   wherein an inner wall of said outer member includes positioning grooves extending in an axis direction of said outer member, said grooves formed at even intervals along a circumferential direction of said inner wall,
   wherein when one projection portion is inserted in one of said positioning grooves, the other projection portion touches said inner wall of said outer member and is not within one of said positioning grooves.

2. The removable marking device for the mold as described in claim 1, wherein said positioning groove is formed so that its cross section is substantially half circular, said inserted portion is formed spherically and said curvature radius of said positioning groove is substantially equal to said radius of said inserted portion.

3. A removable marking device for a mold comprising:
   a substantially cylindrical outer member,
   an indicator rotatable around an axis of said outer member,
   a fixing apparatus fixing a lower end of said indicator rotatably with said bottom end of said outer member,
   a mark portion formed on an upper surface of said outer member and said indicator,
   wherein said indicator has an indication portion for facing said inner surface of said mold and a positioning portion downwardly extending from said lower surface of said indicator,
   wherein an inner wall of said outer member forms an upper bore portion containing said indicator and a middle bore portion having a smaller diameter than a diameter of said upper bore portion, wherein said positioning portion includes a pair of positioning projection protruding radially, said positioning projections extending at right angles to each other,
   each of said positioning projections including a positioning spring buried in said indicator and an insert portion located at an end of said respective positioning spring,
   wherein said middle bore portion has positioning grooves extending in an axis direction of said outer member at even intervals along a circumferential direction of said middle bore portion,
   wherein a number of said positioning grooves is not a multiple of 4.

4. The removable marking device for the mold as described in claim 3, wherein said indicator has a thread downwardly extending from said positioning portion,
   said fixing apparatus is a nut screwed with said thread,
   said outer member includes a lower bore portion having a larger diameter than said diameter of said middle bore portion in lower of said middle bore portion,
   a spring is interposed between said nut and said upper surface of said lower bore portion, and
   said spring is downwardly biased to said nut.

5. The removable marking device for the mold as described in claim 4, wherein at least one engageable projection is formed on a periphery surface of said nut, and wherein said lower bore portion has an engageable groove engaged with said engageable projection.

6. The removable marking device for the mold as described in claim 5, wherein a cover member is fit in said bottom end of said outer member, an opening is formed in said center of said cover member and said lower end of said indicator is inserted in said opening.

7. The removable marking device for the mold described in claim 6, wherein when an upper surface of said indicator is flush with an upper surface of said outer member, the bottom end of a thread of said indicator is positioned above the upper end of said engageable groove.

8. The removable marking device for the mold as described in claim 7, wherein said positioning groove is formed so that its cross section is substantially half circular, said inserted portion is formed spherically and said curvature radius of said positioning groove is substantially equal to said radius of said inserted portion.

9. The removable marking device for the mold as described in claim 6, wherein said positioning groove is formed so that its cross section is substantially half circular, said inserted portion is formed spherically and said curvature radius of said positioning groove is substantially equal to said radius of said inserted portion.

10. The removable marking device for the mold as described in claim 5, wherein when an upper surface of said indicator is flush with an upper surface of said outer member, said bottom end of a thread of said indicator is positioned above said upper end of said engageable groove.

11. The removable marking device for the mold as described in claim 10, wherein said positioning groove is formed so that its cross section is substantially half circular, said inserted portion is formed spherically and said curvature radius of said positioning groove is substantially equal to said radius of said inserted portion.

12. The removable marking device for the mold as described in claim 5, wherein said positioning groove is formed so that its cross section is substantially half circular, said inserted portion is formed spherically and said curvature radius of said positioning groove is substantially equal to said radius of said inserted portion.

13. The removable marking device for the mold as described in claim 4, wherein a cover member is fit in said bottom end of said outer member, an opening is formed in said center of said cover member and said lower end of said indicator is inserted in said opening.

14. The removable marking device for the mold as described in claim 13, wherein when an upper surface of said indicator is flush with an upper surface of said outer member, said bottom end of a thread of said indicator is positioned above said upper end of said engageable groove.

15. The removable marking device for the mold as described in claim 14, wherein said positioning groove is formed so that its cross section is substantially half circular, said inserted portion is formed spherically and said curvature radius of said positioning groove is substantially equal to said radius of said inserted portion.

16. The removable marking device for the mold as described in claim 13, wherein said positioning groove is formed so that its cross section is substantially half circular, said inserted portion is formed spherically and said curvature radius of said positioning groove is substantially equal to said radius of said inserted portion.

17. The removable marking device for the mold as described in claim 4, wherein said positioning groove is formed so that its cross section is substantially half circular, said inserted portion is formed spherically and said curvature radius of said positioning groove is substantially equal to said radius of said inserted portion.

18. The removable marking device for the mold as described in claim 3, wherein said positioning groove is formed so that its cross section is substantially half circular, said inserted portion is formed spherically and said curvature radius of said positioning groove is substantially equal to said radius of said inserted portion.

* * * * *